May 31, 1960 W. T. MANESS 2,938,416
CHAIN-GEAR DRIVEN POWER WRENCH
Filed April 1, 1959 2 Sheets-Sheet 2
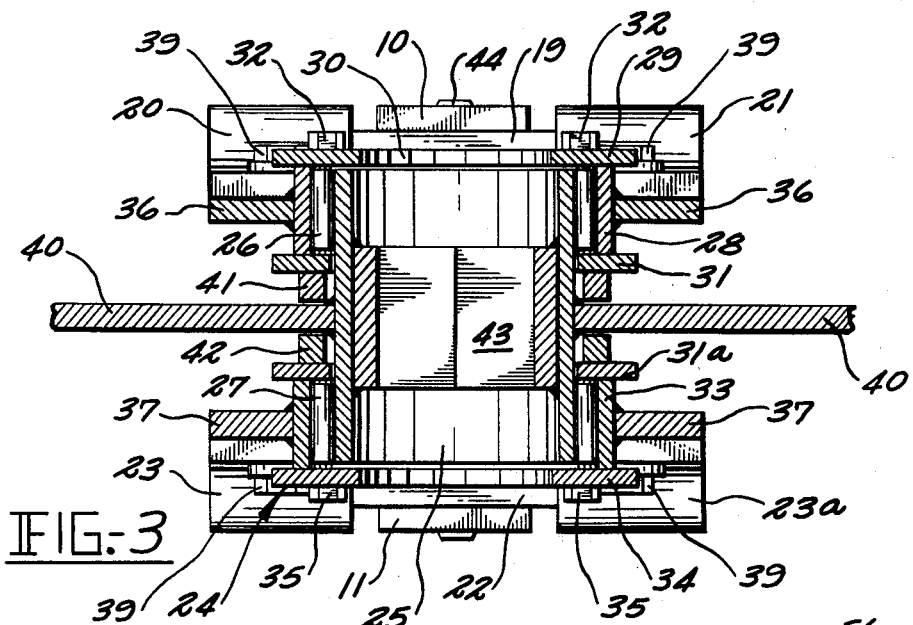
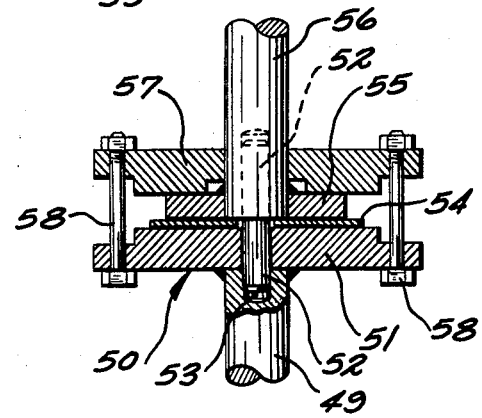
INVENTOR
WILLIAM T. MANESS
BY Herbert A. Winturn
ATTORNEY

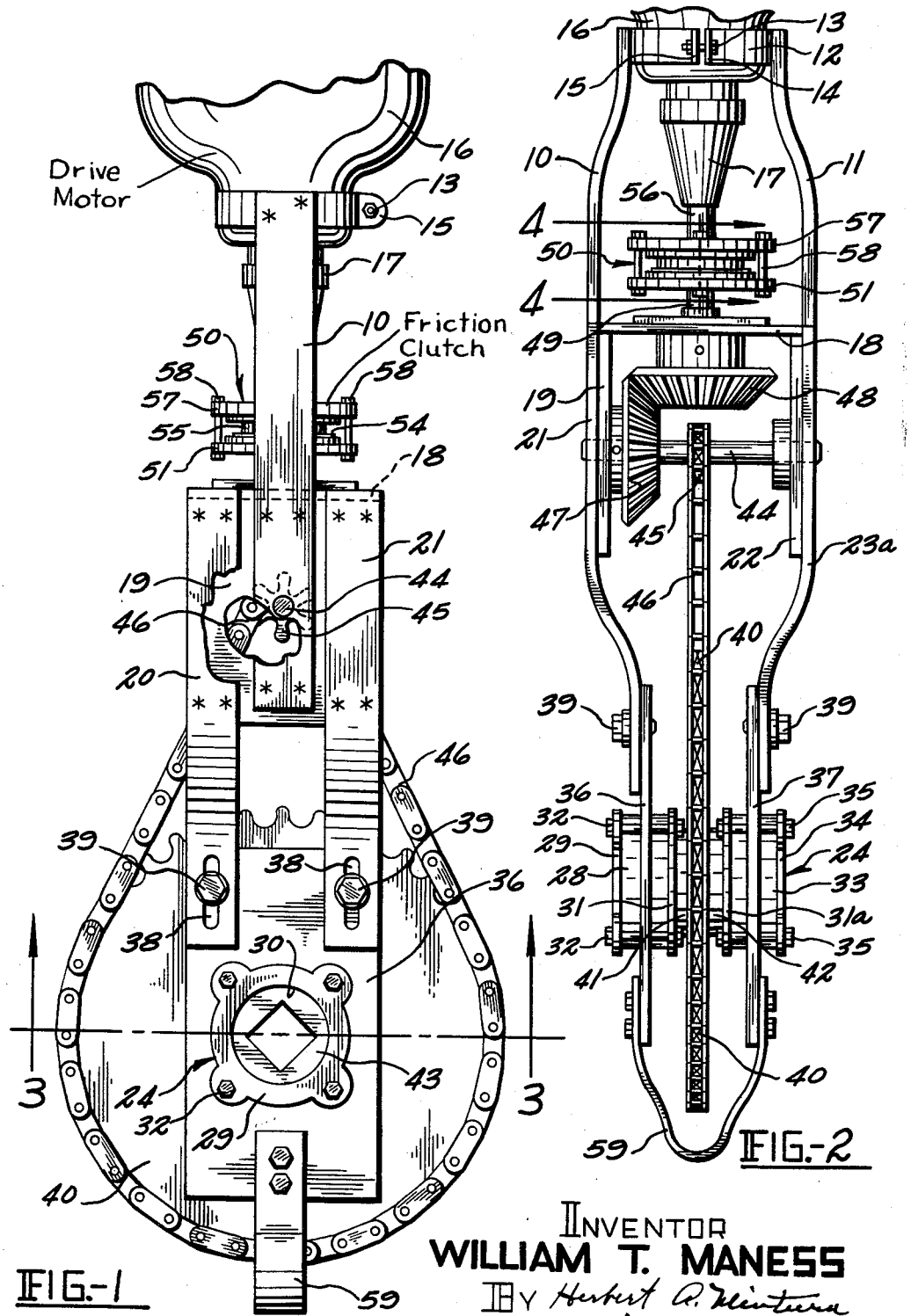

2,938,416

United States Patent Office
Patented May 31, 1960

2,938,416

CHAIN-GEAR DRIVEN POWER WRENCH

William T. Maness, Box 62, Staunton, Ind.

Filed Apr. 1, 1959, Ser. No. 803,530

1 Claim. (Cl. 81—57)

This invention relates to a wrench to be power driven and of that type which is suitable for use in opening and closing valves in pipe lines of considerable size, such as in oil pipe lines, gas pipe lines, or other valve controls in the oil or gas fields, as well as in steam generating plants. In fact the wrench finds use in any field where a valve is to be opened and closed, particularly where the stem of the valve has to be rotated for some little time in order to get the full opening or closing of the valve.

A primary object of the invention is to provide an exceedingly light weight structure which may be driven from any suitable power souce such as an electric drill, and which has a minimum number of parts with extreme durability and ample power for the service required.

One particular form of the invention is illustrated in the accompanying drawings in which Fig. 1 is a view in top plan of a structure embodying the invention;

Fig. 2 is a view in side elevation;

Fig. 3 is a view in vertical section on the line 3—3 in Fig. 1; and

Fig. 4 is a view in section on the line 4—4 in Fig. 2.

A pair of top and bottom arms 10 and 11 are secured at corresponding ends to a split band 12 which may be contracted by means of a bolt 13 passing through two outturned ears 14 and 15 normally spaced apart. The band 12 serves as a clamp to engage any suitable power source herein shown as a motor 16. The chuck 17 of the motor 16 extends between the arms 10 and 11.

A plate 18 extends between the spaces apart the arms 10 and 11, extending beyond the arms 10 and 11 in each instance to both sides thereof, and this plate 18 is secured to those arms by any suitable means, such as by welding. A plate 19 is secured to the inner or relatively under side of the arm 10, Fig. 1, and extends beyond the arm 10 on both sides a sufficient distance in each instance to receive thereover an end portion of a bar 20. In like manner, there is fixed to the upper side of the plate 19 a bar 21 to extend in parallelism with the arm 10 and also with the bar 20 as shown in Fig. 1.

The arm 11, which is relatively the lower arm, likewise has a plate 22 fixed to its upper side and of a width greater than that of the arm 11 to receive thereunder and in parallelism with the arm 11 a pair of bars 23 and 23a, one on each side of the arm 11. These two sets of bars extend from the upper and lower plates 19 and 22 a distance to receive therebetween a bearing member 24.

This bearing member 24 has a central cylindrical sleeve or shell 25 rotatably carried between upper and lower rollers 26 and 27 respectively. The upper rollers 26 are carried externally of the shell 25 and within a raceway 28. An outer retainer 29 having a circular, central opening 30, fits over the upper end of the raceway 28 and likewise over the upper end of the shell 25, Fig. 3. An inner or lower retainer ring 31 freely surrounds the shell 25 and bears against the raceway 28 to retain the rollers 26 therewithin, this contact of the ring 31 with the raceway 28 being maintained by means of cap screws 32.

The set of rollers 27 are carried within a roller raceway 33 externally of the shell 25, and are retained therein from the under side by means of a ring 34 held against the raceway 33 by means of cap screws 35 entering an inner retainer ring 31a which freely surrounds the shell 25. The member 34 not only retains the rollers 27 within the raceway 33, but limits axial travel of the shell 25 between it and the upper retaining member 29.

The raceway 28 is fixed to an upper plate 36 and the lower raceway 33 is fixed to a lower plate 37. These two plates 36 and 37 are spaced apart one from the other a distance to bear between the upper and lower bars 20, 21, and 23, 23a. Each of these bars is slotted as indicated in Fig. 1 longitudinally thereof, the slot in each instance being indicated by the numeral 38, and a bolt or cap screw 39 extends through each of the slots to engage the respective plates 36 and 37 so that the bearing member 24 may be advanced or retracted in respect to the free ends of those bars.

A sprocket wheel 40 is fixed to the shell 25, Fig. 3, to have the shell 25 extend centrally therethrough. Spacer rings 41 and 42, Fig. 3, are interposed between the retainer rings 31 and 31a, one respectively on each side of the wheel 40. A valve stem fitting 43 is secured within the shell 25, Figs. 1 and 3, so as to be revolved with the shell. The fitting 43 shown has a rectangular opening therethrough to fit a rectangular valve stem. The shape of this opening of course will depend upon the shape of the valve stem and its sides, some valve stems being five sided requiring a fitting accordingly.

A cross shaft 44 is rotatably mounted to extend between the plates 19 and 22, and carries centrally of its length a sprocket wheel 45. A chain 46 extends around the sprocket wheel 45 and also the larger sprocket wheel 40.

Also fixed to the shaft 44 is a bevel gear 47 in constant mesh with a second bevel gear 48. This gear 48 is fixed on a shaft 49 rotatably carried by the cross plate 18.

The shaft 49, Fig. 4, carries a slip clutch generally designated by the numeral 50. This clutch 50 comprises a fixed plate 51, that is fixed to the shaft 49, and through which plate 51 there extends a pilot 52 entering into a pilot bore 53 in the end of the shaft 49. A clutch friction disc 54 receives the pilot 52 therethrough and rests on the plate 51. A clutch disc 55 is fixed to a shaft 56 from which axially extends the pilot 52. A pressure plate 57 revolubly surrounds the shaft 56, and bears against the disc 55. The degree of pressure against the disc 55 is determined by the bolts 58 which pass through the member 51 and the member 57. The shaft 56 is available to be gripped by the chuck 17, Fig. 2.

Upon turning of the shaft 56 by the power source 16, the clutch 50 will be rotated, with the bolts 58 set up sufficiently to transmit power therethrough to the shaft 49, to the gear 48, gear 47, shaft 44, sprocket 45, chain 46, sprocket wheel 40, and the member 43 which will have been engaged over a valve stem (not shown) which is to be rotated to either an open or closed position. In either of these positions, when the valve stem reaches its limit of permissible travel, the clutch 50 will slip by reason of the predetermined adjustment of the bolts 58 allowing the members 55, 54, and 51 to slip relatively one with the other. In order to protect the forward end of the chain 46 and its engaged wheel 40, a guard 59 is carried from the plates 36 and 37, Figs. 1 and 2, this guard being secured to those plates in any suitable manner. The slack in the chain 46 may be taken up by slipping the bearing unit 24 relative to the arms 19, 21 and 23, 23a as above indicated, and the distance between centers of the sprocket wheel 40 and the sprocket 45 maintained as desired by tightening the screw members 39.

Thus it is to be seen that I have provided an extremely simple structure for the purposes designated to provide an exceedingly light weight device and yet rigidly braced. Normally a housing would be provided to cover over the chain 46 in order to prevent injury to the operator, such a cover not forming a part of the invention per se, and hence not being illustrated.

Therefore while I have described the invention in this one particular form in detail, I do not desire to be limited to that precise form beyond the limitations which may be imposed by the following claim.

I claim:

A power wrench coupling to a power source comprising a pair of spaced apart arms; a plate secured to each of said arms spaced apart in approximate parallelism; a pair of bars, one to each side of the respective arms, fixed to each of said plates and extending therefrom; a bearing member carried by and between the extending portions of said bars; a shell revolubly mounted in said member and having a circumferentially exposed portion; a sprocket wheel; said shell extending centrally through said wheel and fixed thereto; a transverse member carried by said arms; a two-part shaft rotatably carried by said transverse member; a friction release clutch interposed between said shaft parts; a cross-shaft rotatably carried by and between said arms; gear means drivingly interconnecting one of said shaft parts with said cross shaft; a sprocket fixedly carried by said cross shaft; a chain surrounding said wheel and said sprocket; and means attaching said arms to said power source and aligning said two-part shaft with said source.

References Cited in the file of this patent

UNITED STATES PATENTS

| | | |
|---|---|---|
| 2,544,639 | Calhoun | Mar. 13, 1951 |
| 2,650,070 | Lundeen | Aug. 25, 1953 |
| 2,672,065 | Danuskie | Mar. 16, 1954 |
| 2,746,331 | Andersen | May 22, 1956 |
| 2,753,744 | Therien | July 10, 1956 |
| 2,784,626 | Paget | Mar. 12, 1957 |
| 2,825,252 | Roberts | Mar. 4, 1958 |

FOREIGN PATENTS

| | | |
|---|---|---|
| 425,441 | Great Britain | Mar. 14, 1935 |